J. W. COLLIER.
VEHICLE TRAIN AND VEHICLE.
APPLICATION FILED OCT. 25, 1919.
1,391,760.
Patented Sept. 27, 1921.
2 SHEETS—SHEET 1.
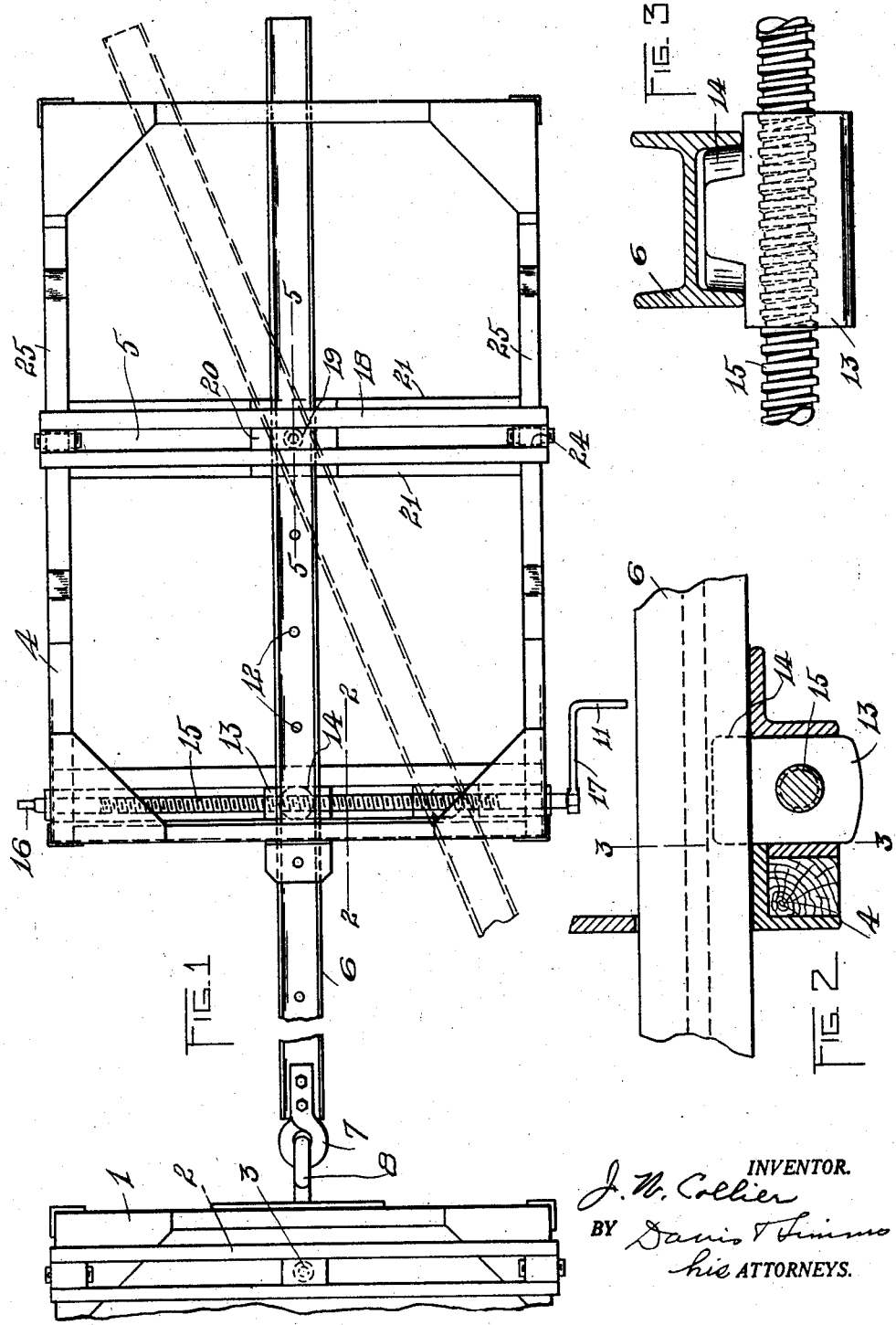
INVENTOR.
J. W. Collier
BY Davis & Simms
his ATTORNEYS.

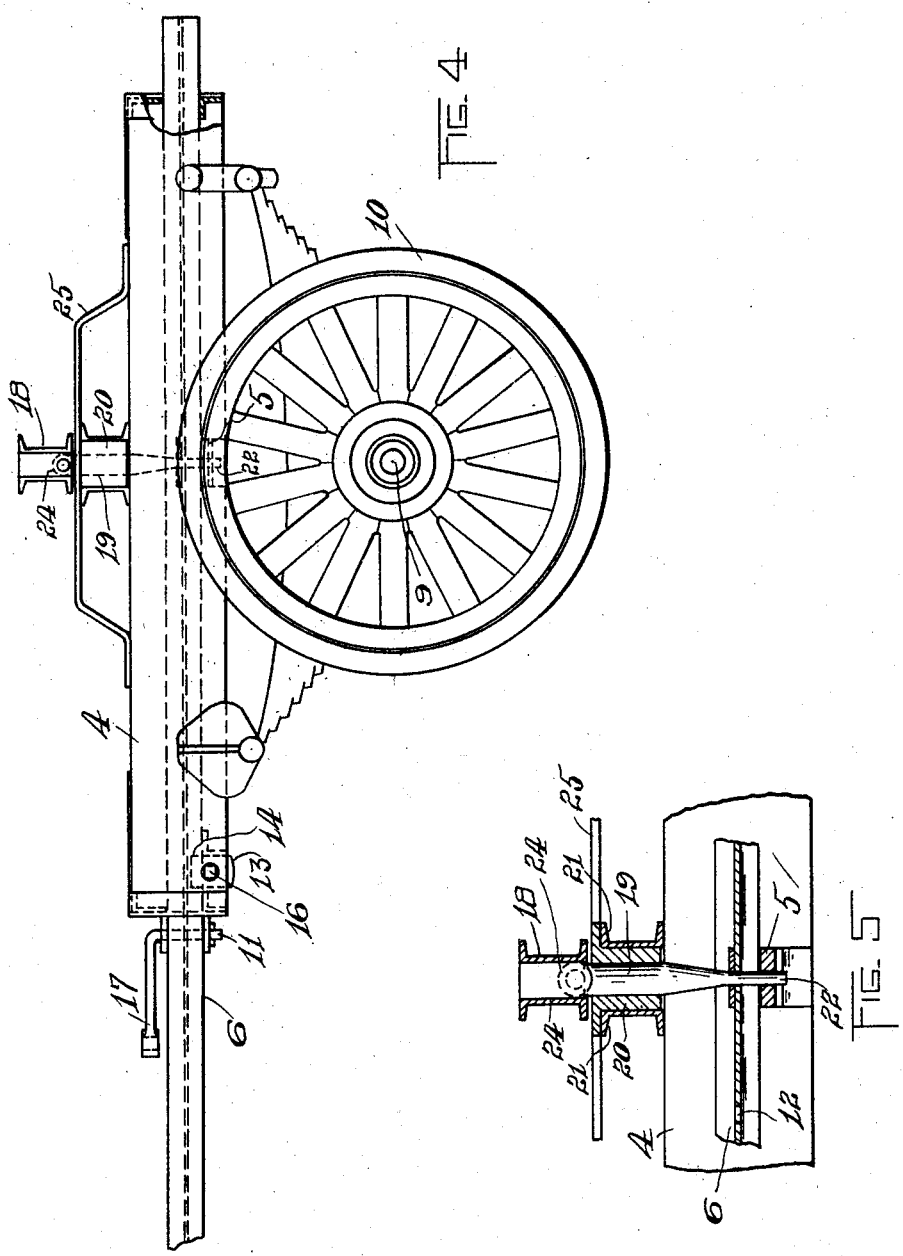

UNITED STATES PATENT OFFICE.

JOSEPH W. COLLIER, OF NEWARK, NEW YORK, ASSIGNOR TO ARCADIA TRAILER CORPORATION, OF NEWARK, NEW YORK, A CORPORATION.

VEHICLE-TRAIN AND VEHICLE.

1,391,760.  Specification of Letters Patent.  Patented Sept. 27, 1921.

Application filed October 25, 1919. Serial No. 333,278.

*To all whom it may concern:*

Be it known that I, JOSEPH W. COLLIER, a subject of the King of Great Britain, and resident of Newark, in the county of Wayne and State of New York, have invented certain new and useful Improvements in a Vehicle-Train and Vehicle, of which the following is a specification.

The present invention relates to a vehicle train and a vehicle used in connection with the same, an object of this invention being to so construct the vehicle and connect the same that the train may readily turn a corner while a load of lumber or other material extends between and is supported by both vehicles and this without the necessity of shifting the position of the material on the supporting parts of the two vehicles.

To this and other ends, the invention consists of certain parts and combinations of parts, all of which will be hereinafter described, the novel features being pointed out in the appended claims.

In the drawings:

Figure 1 is a plan view of a train embodying two vehicles, a portion only of one vehicle being shown;

Fig. 2 is a section on the line 2—2, Fig. 1 showing the connection between the reach pole and the adjusting means therefor;

Fig. 3 is a section on the line 3—3, Fig. 2;

Fig. 4 shows in side elevation a trailer embodying the present invention; and

Fig. 5 is a detail section on the line 5—5, Fig. 1.

Referring more particularly to the drawings 1 indicates a forward vehicle which may be self-propelled. On the rear of this vehicle a bolster 2 is mounted to turn about a vertical axis 3. Connected to the rear of the vehicle 1 is a trailer comprising a body 4 preferably of rectangular formation, its front and rear sides each formed of two spaced pieces, which permit a lateral movement of a reach pole 6.

This reach pole 6 preferably in the form of an I-beam is pivotally mounted on the body and extends between the two pieces of the front and rear sides.

The forward end of the pole preferably has a free flexible connection with the rear end of the vehicle 1 and to this end it is provided at its forward end with an eye 7 engaging the hook 8 on the rear end of the vehicle 1.

The body 4 is preferably supported on a single axle 9 carrying the two wheels 10 shown only in Fig. 4, and the pivot of the reach pole is over this axle and perpendicular thereto. Normally the reach pole lies longitudinally of the body 4 and to this end a securing pin 11 passes through alined openings on the front side of the frame 4 and one of the openings 12 in the reach bar or pole 6 to secure the reach pole against swinging on the trailer body 4. Adjustment of the reach pole laterally on the trailer body is preferably effected by removing the pin 11 and giving the reach pole over to an adjusting mechanism for shifting the reach pole laterally. This adjusting mechanism, in this instance, comprises a nut 13 guided on the body 4 transversely thereof and at the forward end this nut having a circular projection 14 which extends upwardly into the channel on the under side of the reach pole or bar 6. The nut is mounted upon a screw 15 which is journaled at its ends in the longitudinal sides of the body 4 and projects from said ends where it is provided with squared portions 16 for engagement by a crank handle 17 through which the screw may be rotated in order to shift the nut transversely of the vehicle and in this way shift the reach pole laterally. This crank handle also embodies the pin 11 which is designed for holding the reach pole against pivotal action with reference to the frame 4.

The body of the vehicle has supported thereon a bolster 18, which is mounted to turn about an upright axis intersecting the axle 9 of the vehicle and common to the turning axis of the reach pole 6. A single pin serves as a pivot for the bolster and for the reach pole and to this end is rigid with and depends from the bolster. This pin has a cylindrical portion 19 turning in a bearing block 20 between the two channel beams 21 which are supported on the longitudinal sides of the body 4, the lower end of the pin being reduced at 22 and passed through any one of the openings 12 in the reach bar 6. The bolster may be still further supported at opposite ends by rollers 24 which travel on trackways 25 supported on the longitudinal sides of the body 4. In using this invention, the material is supported on the train by resting upon the bolster 2 and the bolster 18. During straight or direct traveling or the turning of wide angle corners, the pin 11 is employed for securing the reach pole 6 against turning relatively to the body 4 but, in turning sharp corners, the pin 11 is removed and the crank handle 17 is turned to shift the nut in the proper direction to turn the body and the wheels relatively to the reach pole and the bolster, the latter being held against turning with the body through the material which is supported on the bolster of the trailer and the bolster of the forward vehicle.

A wagon train constructed in accordance with this invention permits the material to be supported by two vehicles and enables the train to turn sharp corners without shifting the material on those portions of the vehicles on which the material rests. The material rests upon two bolsters, one on one vehicle and the other on a two wheeled vehicle which is connected to the said vehicle by a reach pole, the connection being such that the reach pole has a free relative movement to the forward vehicle and a controlled pivoted movement on the rear vehicle. This control may be effected from either side of the train and shifts the trailing or rear vehicle with reference to the pole and the bolster, the bolster and the pole turning about a common axis formed preferably by a pin depending from the bolster and passing through the pole, this pin also serving to adjustably connect the pole to the trailing vehicle body so that the distance between the trailing vehicle body and the forward vehicle body may be adjusted.

What I claim as my invention and desire to secure by Letters Patent is:

1. The combination of two vehicles each of which has a bolster mounted thereon to turn about an upright axis, the rear one of which is two wheeled and has a reach pole pivotally mounted thereon with a free flexible connection with the other or forward vehicle, and adjusting means between the body of the two wheeled vehicle and the reach pole for swinging the body with reference to the reach pole and to the bolster carried by such body.

2. A two wheeled trailer comprising a body, a bolster mounted to swing about an upright axis on the body, a reach pole pivotally connected to the body, and adjusting means between the body and the reach pole for swinging said body with reference to the reach pole and the bolster.

3. A two wheeled trailer comprising a body, a bolster mounted to swing about an upright axis on the body, a reach pole mounted to swing about the same axis as the body, and adjusting means between the body and the reach pole for swinging said body with reference to the pole and the bolster.

4. A two wheeled trailer comprising a body, a bolster, a reach pole, and a single pivot permitting the reach pole and the bolster to turn about a common axis.

5. A two wheeled trailer comprising a body, a bolster having a depending pivot pin rigid therewith and turning in the body, and a reach pole pivotally mounted on said pin.

6. A two wheeled trailer comprising a body, a reach pole provided with a longitudinally extending series of openings, and a pivot pin arranged to pass through any one of the openings to pivotally support the reach pole, and means for shifting said body with reference to the reach pole, said means having connection with the reach pole which permits its operation for any adjustment of the reach pole longitudinally of the body.

7. A two wheeled trailer comprising a body, a reach pole provided with a longitudinally extending channel in the under side thereof pivotally mounted and longitudinally adjustable on the body, and an adjusting means embodying a nut movable transversely of the body and engaging in said channel to shift the reach pole laterally on the body.

8. In combination with a vehicle body, a reach pole pivotally mounted on the body to swing laterally, means permitting the adjustment of the reach pole longitudinally on said body, and mechanism for effecting a relative movement between the reach pole and the body on the pivot, said mechanism having a connection with the reach pole which permits the longitudinal adjustment of the reach pole on the body.

JOSEPH W. COLLIER.